Patented Aug. 2, 1949

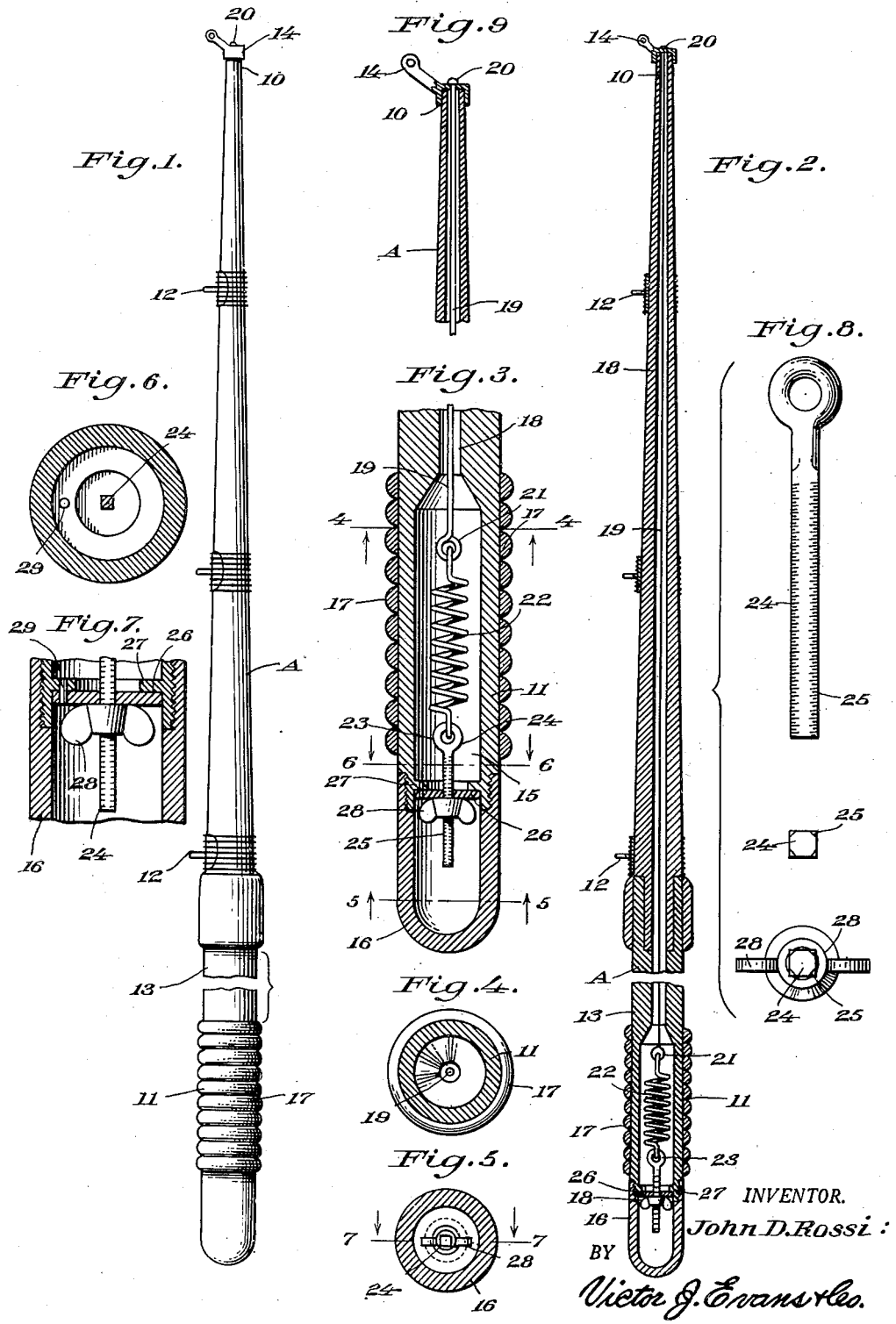

2,478,131

UNITED STATES PATENT OFFICE 2,478,131

ADJUSTABLE ACTION FISHING ROD

John D. Rossi, Vineland, N. J.; Jennie B. Rossi administratrix of said John D. Rossi, deceased Application May 17, 1944, Serial No. 535,991

1 Claim. (Cl. 43—18)

The invention relates to a fishing rod, and more especially to an adjustable fisherman's pole or rod.

The primary object of the invention is the provision of a rod or pole of this character, wherein the same is made to have interiorly thereof an adjustable tensioning medium, so that such pole or rod can be regulated to provide different degrees of elasticity, this being beneficial in the use of the same.

Another object of the invention is the provision of a pole or rod of this character which is adjustable with dispatch so as to vary the elasticity of the said pole or rod to satisfy the fancy of the user.

A further object of the invention is the provision of a pole or rod of this character, wherein adjustability of the same is had at the butt-end thereof, the adjusting means being concealed and is readily and easily accessible for the operation thereof.

A still further object of the invention is the provision of a pole or rod of this character, which is simple in construction, thoroughly reliable and efficient in operation, strong, durable, neat in appearance, readily and easily adjusted for the purpose intended, and inexpensive to manufacture.

With these and other objects in view the invention consists in the features of construction, combination and arrangement of parts as will be hereinafter more fully described in detail, illustrated in the accompanying drawing, which shows the preferred embodiment of the invention, and pointed out in the claim hereunto appended.

In the accompanying drawing:

Figure 1 is an elevation of the fishing pole or rod constructed in accordance with the invention.

Figure 2 is a vertical longitudinal sectional view thereof.

Figure 3 is a fragmentary enlarged sectional view through the butt-end of the pole or rod.

Figure 4 is a sectional view on the line 4—4 of Figure 3 looking in the direction of the arrows.

Figure 5 is a sectional view on the line 5—5 of Figure 3 looking in the direction of the arrows.

Figure 6 is a sectional view on the line 6—6 of Figure 3 looking in the direction of the arrows.

Figure 7 is an enlarged detail sectional view thru a portion of the butt-end of the pole or rod, taken on the line 7—7 of Figure 5.

Figure 8 is an exploded plan view of the adjusting bolt and adjuncts.

Similar reference characters indicate corresponding parts throughout the several views in the drawing.

Referring to the drawing in detail A denotes generally a fishing pole or rod of any standard construction, sectional in kind, having a tip end 10 and a butt-end 11, respectively, while exteriorly of the rod or pole are guide eyes 12 for a reel line, not shown, the reel being preferably located in the external seat 13 therefor, while the eyes 12 are fitted in any suitable permanent manner. The tip end 10 carries a guide fixture 14 for the line, while provided in the butt-end 11 is a chamber 15, accessible on removal of a cap 16, detachably threaded on the said butt-end 11.

This butt-end 11 is formed with an exterior hand grip 17, of any approved type.

The rod or pole A has a central bore 18 opening into the chamber 15 and through the tip end 10, respectively. This bore 18 loosely accommodates a wire, cable or the like 19, which has union at 20 with the fixture 14 at its outer end, while the opposite inner end of this wire, cable, or the like 19 is formed with an eye terminal 21 to which is loosely connected a coiled tensioning spring 22 confined within the chamber 15. The spring 22 is also loosely connected to the eye-head 23 of an adjusting bolt 24 having the mutilated threaded shank 25. The shank 25 is passed through a washer 26 seated against a shoulder 27 internally of the chamber 15, while adjustable on this shank is a winged nut 28, which has contact with the washer 26. Thus it should be obvious that the spring 22 stresses the wire, cable or the like 19, and the tension of the spring 22 can be varied to increase or decrease the pull on the said wire, cable or the like, and in this manner provide different degrees of elasticity to the pole or rod A.

The washer 26 is pinned at 29 to the shoulder 27, so as to prevent turning of such washer when the nut is adjusted on the shank 25 of the bolt 24 for regulating the tensioning action of the spring 22, the nut 28 being accessible on removal of the cap 16 at the butt-end of the pole or rod A.

The shank 25 is of substantially square shape in cross-section while the hole in the washer 27 is similarly shaped thereto, so as to prevent the turning of the bolt 24 therein when adjustment is made, as hereinbefore stated.

What is claimed is:

A fishing rod of the kind described, comprising a hollow pole and handle, a wire secured to the tip of the pole and extending lengthwise toward and within the handle, a coil spring having one end secured to said wire within the handle, a threaded member secured to the other end of said coil spring and loosely passing through a transverse member in the end of the handle, a thumb nut on said threaded member beyond the transverse member, and a cap removably secured to an end of the handle and enclosing the end of the threaded member and the thumb nut.

JOHN D. ROSSI.

REFERENCES CITED

The following references are of record in the file of this patent:

UNITED STATES PATENTS

| Number | Name | Date |
|---|---|---|
| 279,988 | Smith | June 26, 1883 |
| 808,528 | Finney et al. | Dec. 26, 1905 |
| 870,429 | Grimler | Nov. 5, 1907 |
| 1,613,522 | Mathey | Jan. 4, 1927 |
| 2,351,734 | Backe | June 20, 1944 |